(12) United States Patent
Elwell

(10) Patent No.: US 8,011,817 B2
(45) Date of Patent: Sep. 6, 2011

(54) METHOD AND APPARATUS FOR VEHICLE OPAQUE SEE-THROUGH ATTACHMENT

(75) Inventor: James P. Elwell, Johnston, IA (US)

(73) Assignee: Putco, Inc., Story City, IA (US)

( * ) Notice: Subject to any disclaimer, the term of this patent is extended or adjusted under 35 U.S.C. 154(b) by 0 days.

(21) Appl. No.: 12/022,796

(22) Filed: Jan. 30, 2008

(65) Prior Publication Data
US 2009/0190369 A1    Jul. 30, 2009

(51) Int. Cl.
*B60Q 1/44* (2006.01)
*F21V 9/00* (2006.01)

(52) U.S. Cl. ......... 362/485; 362/510; 362/541; 362/293

(58) Field of Classification Search .................. 362/485, 362/486, 505, 510, 540, 541, 545, 296, 496, 362/293
See application file for complete search history.

(56) References Cited

U.S. PATENT DOCUMENTS

| | | | |
|---|---|---|---|
| 3,800,430 A * | 4/1974 | Samra | 340/468 |
| 4,041,302 A * | 8/1977 | Koljonen | 362/464 |
| 5,009,020 A * | 4/1991 | Watanabe | 40/547 |
| 5,497,303 A * | 3/1996 | Decinti et al. | 362/505 |
| 5,684,633 A * | 11/1997 | Lutz et al. | 359/588 |
| 6,561,679 B1 * | 5/2003 | Erion et al. | 362/293 |
| 7,108,411 B2 * | 9/2006 | Pommeret et al. | 362/496 |
| 7,350,949 B2 * | 4/2008 | Meinke et al. | 362/540 |
| 7,497,604 B2 * | 3/2009 | Kleber et al. | 362/506 |
| 7,736,034 B1 * | 6/2010 | McNeal | 362/506 |
| 2002/0012251 A1 * | 1/2002 | Lee | 362/540 |
| 2006/0092655 A1 * | 5/2006 | Shen et al. | 362/539 |

OTHER PUBLICATIONS

Prior art is shown in 2008 Catalog but existed as prior art one year before filing.

* cited by examiner

*Primary Examiner* — Stephen F. Husar
*Assistant Examiner* — Peggy A. Neils
(74) *Attorney, Agent, or Firm* — McKee, Voorhees & Sease, P.L.C.

(57) ABSTRACT

The attachment for a vehicle and the method for providing the attachment to the vehicle includes mounting a housing on the outside of the vehicle. The housing includes a back attachable to the vehicle, a compartment within the housing, and a lens visible from outside the vehicle. At least one or more lights is contained within the compartment between the lens and the outside of the compartment. The lens is opaque when the lights are turned off so as to conceal the lights within the compartment and the lens is visible from outside the vehicle when the lights are turned on.

4 Claims, 5 Drawing Sheets

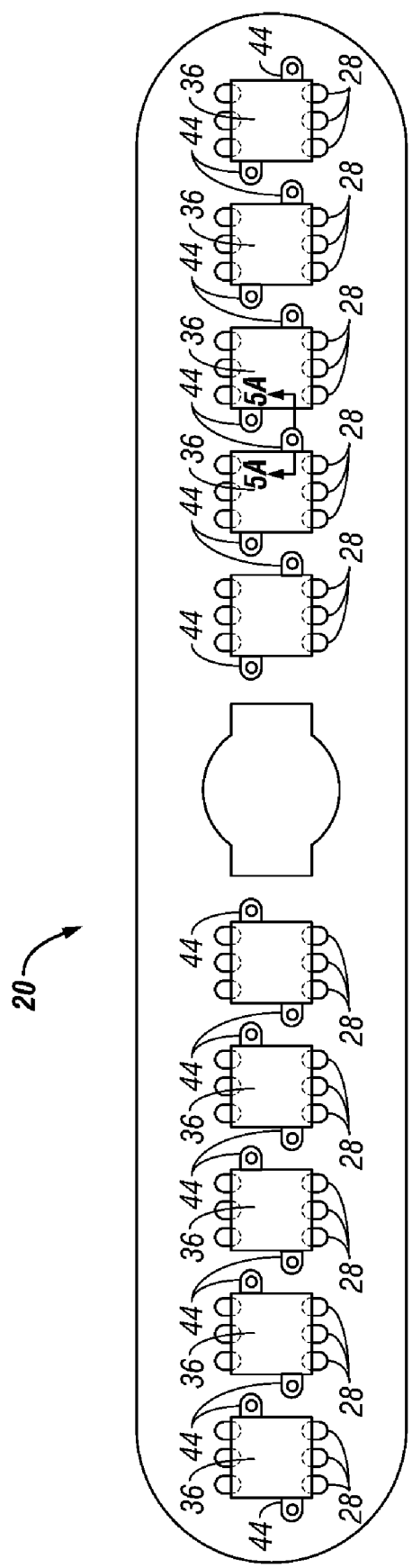
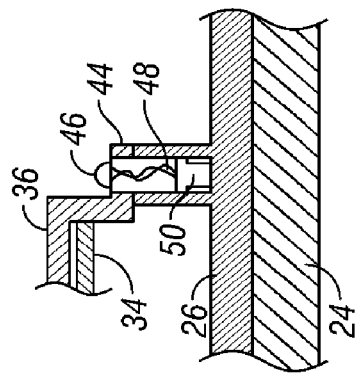
FIG. 5
FIG. 5A

METHOD AND APPARATUS FOR VEHICLE OPAQUE SEE-THROUGH ATTACHMENT

BACKGROUND OF THE INVENTION

The present invention relates to a method and apparatus for vehicle opaque see-through attachment. The invention includes a method and apparatus capable of providing an opaque surface when the lights behind the lens are turned off and capable of providing that the lights are visible from outside the vehicle through the lens when the lights are turned on.

Prior devices included a lens behind a compartment and a light within the compartment. However, the lenses were transparent or translucent, and show the lights when they are both on and off.

Therefore, one of the objects of the present invention is an improved method and attachment for a vehicle providing an opaque lens when the lights are turned off, and providing a see-through lens when the lights are turned on.

A further object of the present invention is to provide a kit which when attached to a vehicle provides an opaque lens when the lights are turned off and which provides a see-through lens when the lights are turned on.

A further object of the present invention is the provision of a lens that presents a chromium appearance from outside the vehicle when the lights are turned off and permits the lights to show through the lens when the lights are turned on.

A further object of the present invention is the provision of a method and apparatus for vehicle opaque see-through attachment wherein the lens between the compartment and the outside of the vehicle includes a first layer and a second layer, one of the first and second layers being translucent or transparent.

A further object of the present invention is the provision of an electrical mechanism that is connected to a turn signal capable of being actuated to turn to the left or the right so that if the lights are turned on sequentially to the left if the turn signal is turned left, and are turned on sequentially to the right if the turn signal is turned right.

A further object of the present invention is the provision of an electrical mechanism that is connected to the braking system capable of braking or not braking so that the lights are turned on when the braking system is braked and the lights are turned off when the braking system is not braked.

A further object of the present invention is the provision of an electrical mechanism that is connected to both the turn signal and the braking system.

Another object of the present invention is the provision of a device which is attractive in appearance, and which provides a durable and efficient operation.

BRIEF SUMMARY OF THE INVENTION

The foregoing objects may be achieved by an attachment for a vehicle comprising a housing mountable on the outside of a vehicle. The housing has a back attachable to the vehicle, a compartment within the housing, and a window opening making the compartment visible from outside the vehicle. A lens is provided within the window and is visible from outside the vehicle. One or more lights within the compartment is covered by the lens. An electrical mechanism is connected to the lights and is capable of turning the lights on or off. The lens is opaque when the lights are turned off so as to conceal the lights within the compartment and prevent the lights from being seen outside the vehicle. The lens also is capable of permitting the lights to show through and be visible through the lens when the lights are turned on so as to permit the lights to be seen from outside the vehicle.

According to another feature of the present invention, the lens presents a calming appearance from outside the vehicle when the lights are turned off and permits the lights to show through the lens when the lights are turned on.

According to another feature of the present invention, the lens is translucent when one or more lights are turned on.

According to another feature of the present invention, the lens has a first layer and a second layer. The first layer provides the opaque appearance when one or more lights are turned off, and the first and second layers provide a translucent appearance when the one or more lights are turned on.

According to another feature of the present invention, one of the first and second layers is transparent.

According to another feature of the present invention, the electrical mechanism is connected to a turn signal capable of being actuated to turn left or right. The lights are turned on sequentially to the left if the turn signal is turned left and are turned on sequentially to the right if the right turn signal is on.

According to another feature of the present invention, the electrical mechanism is connected to the braking system capable of braking or not braking so that the lights are turned on when the braking system is braked and the lights are turned off when the braking system is not braked.

According to another feature of the present invention, the electrical mechanism is connected to both the turn signal and the braking system.

BRIEF DESCRIPTION OF THE DRAWINGS

FIG. 5 is a rear elevational view of the tailgate panel.

FIG. 5A is a sectional view taken along line 5A-5A of FIG. 5.

DETAILED DESCRIPTION OF THE PREFERRED EMBODIMENT

Figure 1:
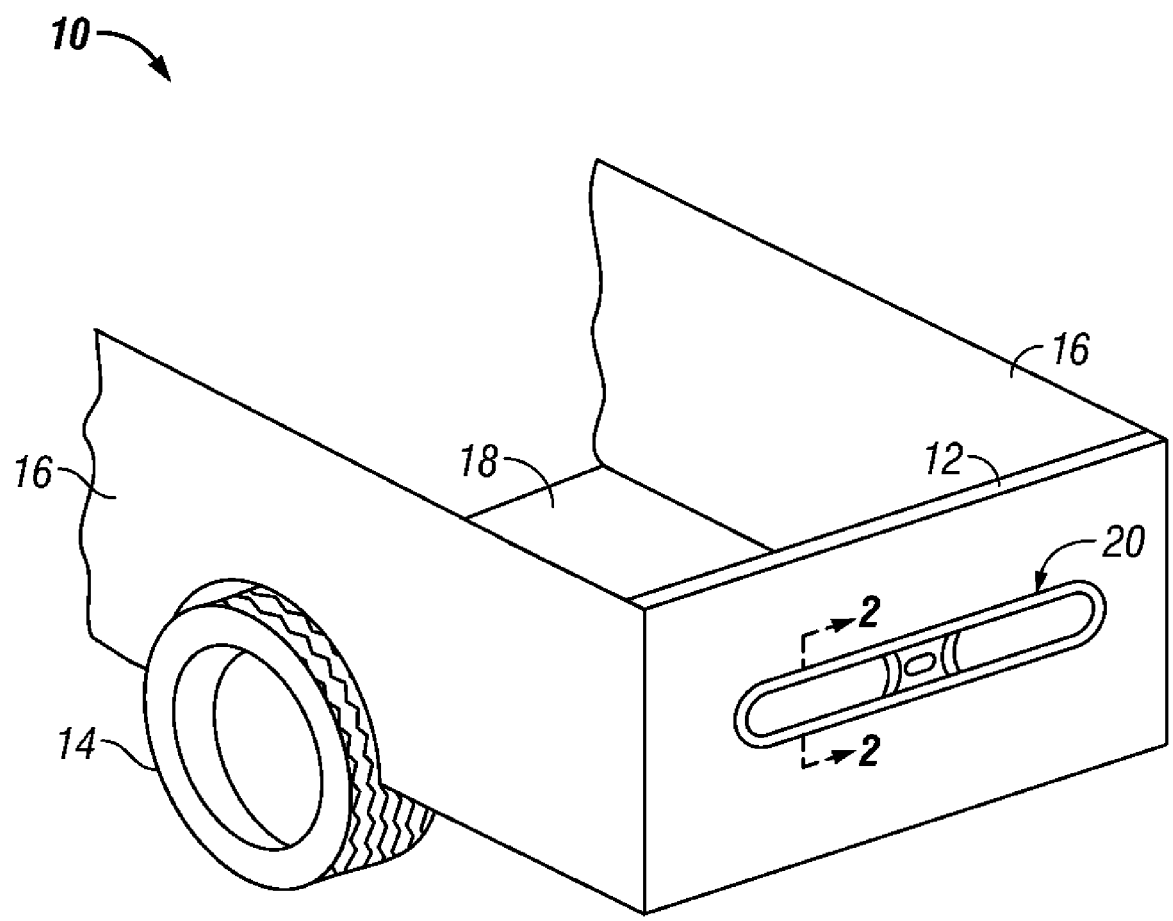
FIG. 1 is a partial perspective view of the rear of a vehicle having the apparatus for opaque see-through attachment thereon.

Referring to FIG. 1, a vehicle 10 is shown. Vehicle 10 includes wheels 14, a tailgate 12, sidewalls 16, and a bed 18. Mounted on the rear of tailgate 12 is a tailgate panel 20. While the mounting or attachment of tailgate panel 20 on tailgate 12 is preferable, the mounting may be on any of the walls of vehicle 10, and may be utilized on an SUV or other vehicle.

Figure 2:
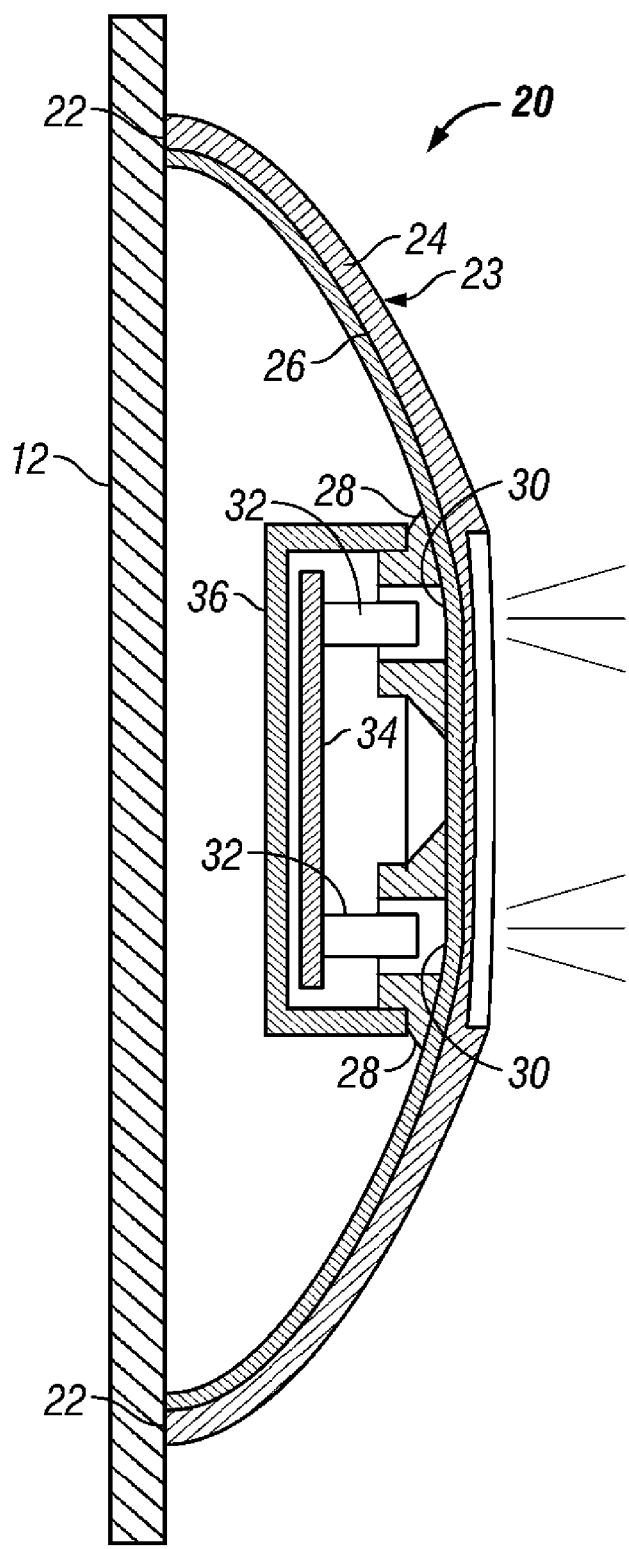
FIG. 2 is an enlarged sectional view taken along line 2-2 of FIG. 1.
Figure 3:
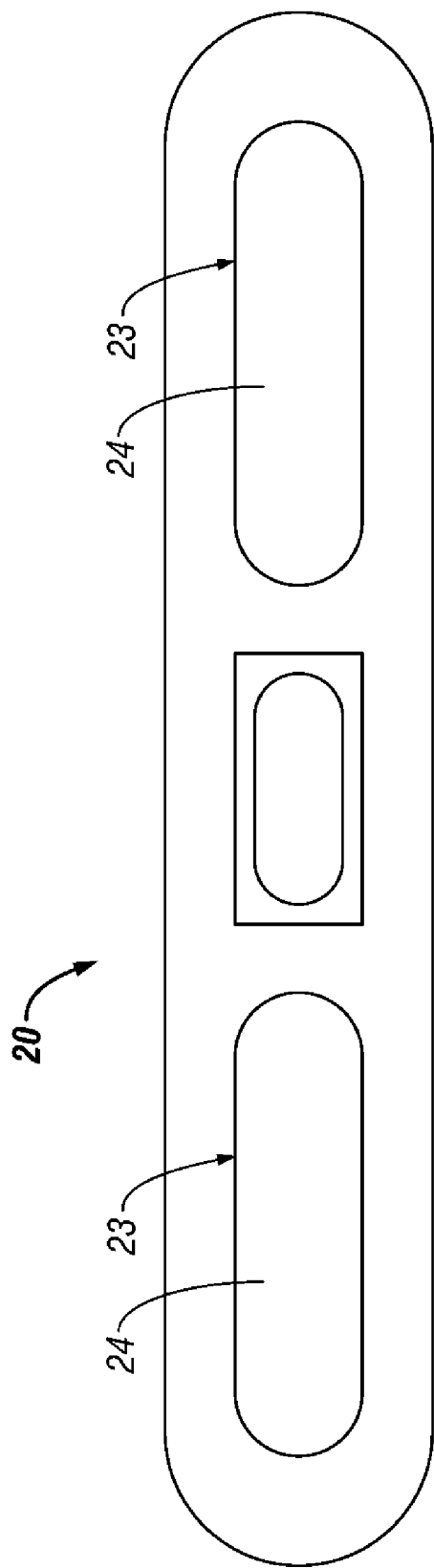
FIG. 3 is a elevational view of the apparatus for vehicle opaque see-through attachment, showing the lights in an off position.
Figure 4:
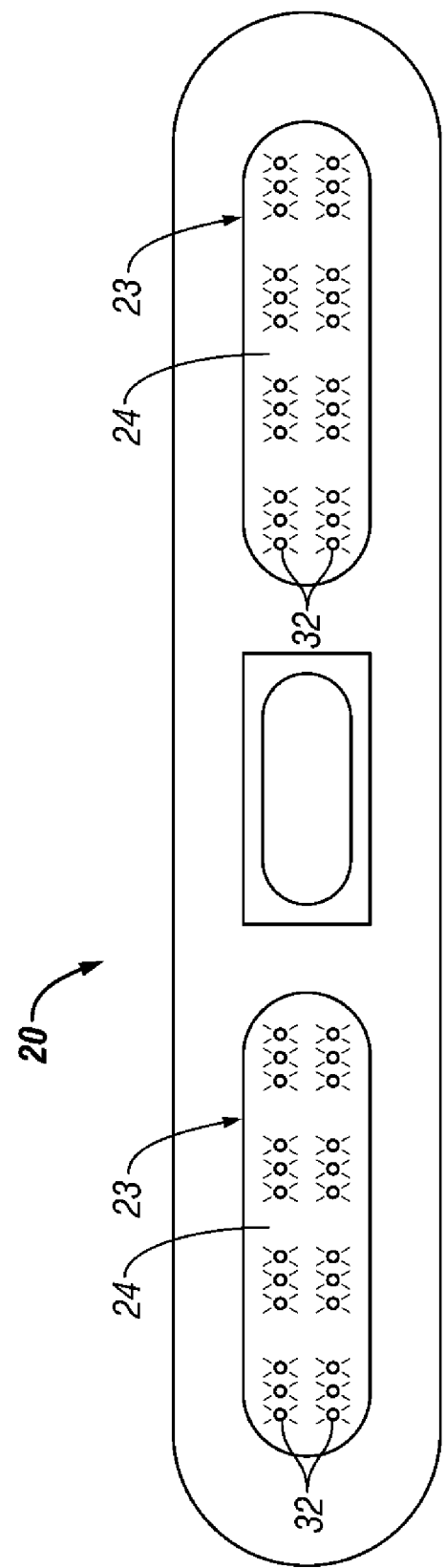
FIG. 4 is a view similar to FIG. 3, but showing the lights in a lighted condition.

Referring to FIG. 2, tailgate panel 20 includes a base 22 that is fitted against tailgate 12 so that no light exists through base 22 and tailgate 12. While tailgate panel 20 is shown in the drawings to be rear open ended, a rear covering may also be used for tailgate panel 20. The primary function of tailgate 20 is that it is attached to vehicle 10 without any light coming through base 22 and tailgate 12. Tailgate panel 20 includes a lense 23 that is comprised of an arcuate clear plastic 24 and a chromium plating 26. Various materials may be utilized for the clear plastic 24 including a translucent material. The preferred material for chromium plating 26 is manufactured by TKS Industrial Co., Ltd., having a regular and established business at 47, Tai Yi Rd., Jen De Hsiang, Tainen Hsien, 717, Taiwan, R.O.C., under Model Number 950001 and 950002. However, other materials for chrome plating 26 may be utilized, including material that has non chromium appearance.

The material used for plates 24 and plating 26 of lens 23 must be opaque so that the lights are not visible through the material when they are not lighted. However, the lights should show through the material when they are lighted so as to be visible from outside the lens 23. The lens 23 may be transparent to the lights when they are lighted, but opaque to the lights when they are not lighted. They may also be translucent when the lights are lighted but opaque when the lights are not lighted.

Furthermore, the clear layer 24 may be completely eliminated and the material 26 utilized only. However, it is preferable that material 24 be utilized so as to protect the layer 26 from scratching or otherwise being damaged.

Light fixtures 28 are glued or otherwise adhered to the inside of the layer 26. Lights fixtures 28 have an opening 30 therein which is exposed at its bottom end directly to layer 26 of lens 23. One or more LEDs 32 may be inserted within the opening 30. Preferably LEDs may be used, but other types of lamps could be used as well, including incandescent or fluorescent lights, or other lights. The LEDs are mounted on a plurality of circuit boards 34.

Extending over circuit boards 34 are a plurality of covers 36. Covers 36 include side edges which rest upon the light fixtures 28. Preferably the covers 36 are opaque so as to confine the lighting to the lights 32. Covers 36 are mounted by tabs 44 (FIGS. 5 and 5A) which include a screw 46 extending through an opening in the tabs 44 and into a post 48. The post 48 has a hole 50 mounted therein and is integral with the lens 23.

Figure 6:
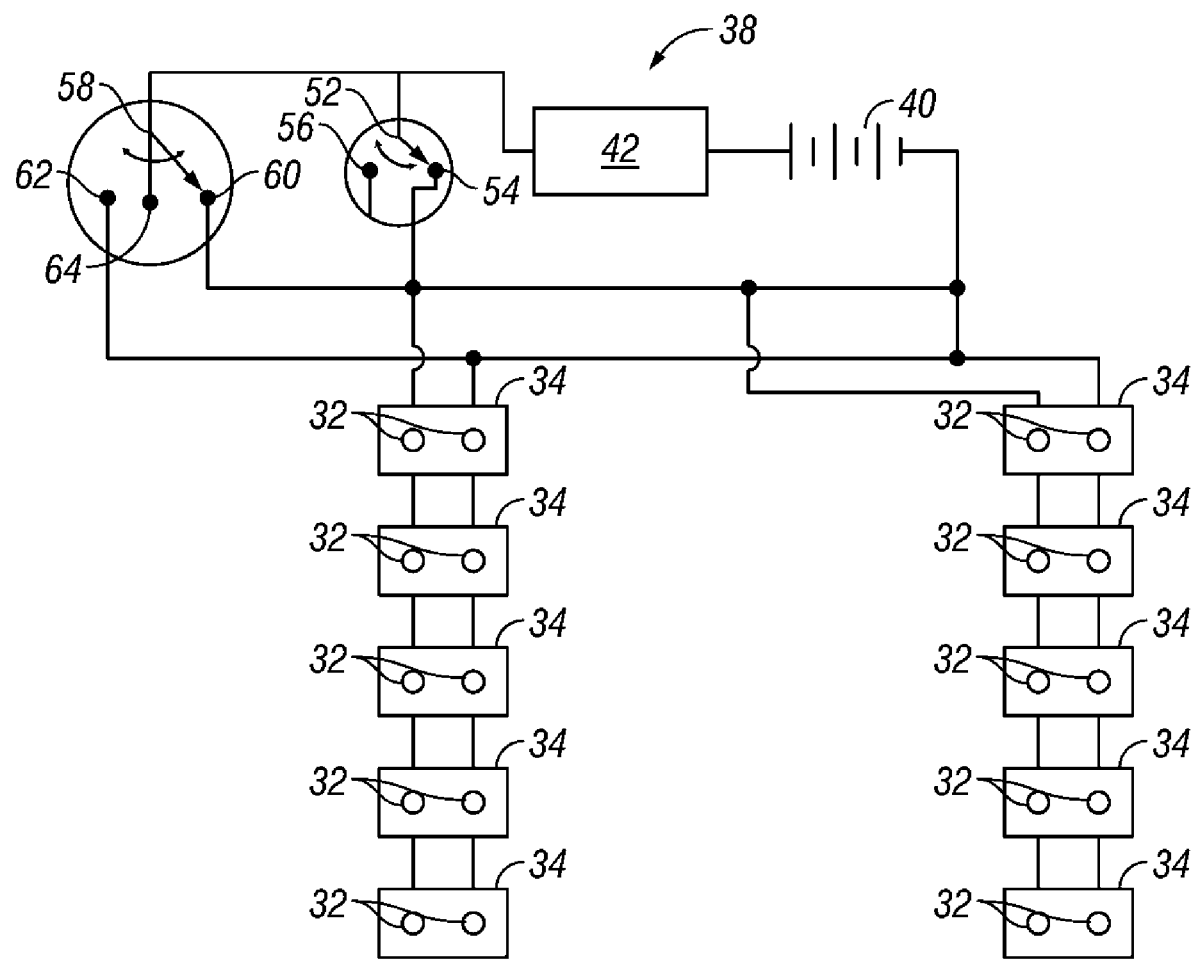
FIG. 6 is a schematic view showing the electrical circuitry of the tailgate panel.

Referring to FIG. 6, a electrical mechanism 38 is shown. Mechanism 38 includes a battery 40 and a generator 42. A brake switch 52 is provided in the circuitry and includes an operative contact 54 and an inoperative contact 56. The switch is moveable between the operative contact 54 and the inoperative contact 56.

A turn signal 58 is also included in the circuitry and includes a left turn contact 60, a right turn contact 62, and an inoperative contact 64. The switch 58 is moveable from the contact 60 to the contact 64 to the contact 62. The various contact boards 34 are also included in the circuitry. Various circuitries may be used, and the electrical mechanism shown at 38 in FIG. 6 is merely one of an example of various types of mechanisms that may be utilized. Preferably, both the turn signal 58 and the brake switch 52 may be utilized in combination with one another. If the turn signal 58 is in contact with member 60, then it operates the LEDs 32 in a sequential pattern moving from left to right. If the contact 58 is in the right position shown at 62, then the LEDs 32 are actuated in a left to right condition. Similarly, the brake switch 52 may be utilized to light the LEDs 32.

The circuit boards 34 are shown in a schematic sense and the LEDs 32 are also shown in a schematic sense in FIG. 6.

The result of the actuation of brake switch 52 by depressing the switch, causes the lights 32 to be lighted. Similarly, the actuation of the turn signal 58 causes the lights to be actuated sequentially either to the left or to the right as described above.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An attachment for a vehicle comprising:
   a lens having a curved plastic shell and a plating visible from outside the vehicle, the curved plastic shell being adapted for being adhered to an outer surface of a vehicle;
   a light fixture adhered directly to the plating and having an opening therein including a bottom end and a top end;
   one or more lights inserted in the top end of the opening of the light fixture;
   an opaque cover having side edges resting on the light fixture confining the lighting to the lights;
   an electrical mechanism connected to the lights and being capable of turning the lights on or off;
   the plating on the lens adjacent the bottom end of the opening of the light fixture; and
   the plating being opaque when the lights are turned off so as to conceal the lights from outside the lens and prevent the lights from being seen outside the vehicle, and permitting the lights to show through and be visible from outside the vehicle when the lights are turned on so as to permit the lights to be seen from outside the vehicle.

2. The attachment for a vehicle of claim 1 wherein the one or more lights are mounted on a circuit board within the opaque cover.

3. An illuminated attachment to an external surface of a vehicle, the illuminated attachment comprising:
   an outer shell having an inner surface and an outer surface, the outer shell having an arcuate cross section with an open rear portion, the rear portion of the shell being adapted for being adhered to a desired location on an exterior surface of a vehicle;
   a coating on the inner surface of the outer shell, the coating being opaque to light from outside the shell and transmissive of light from inside the shell; and
   a plurality of light emitting devices operatively attached to the shell such that the light emitting devices are covered and protected by the shell when the rear portion of the shell is adhered to the vehicle, light produced by the light emitting devices being visible through the shell when the light emitting devices are illuminated.

4. The illuminated attachment of claim 3, further comprising a plurality of light fixtures adhered to the coating, the light fixtures including a plurality of openings through which the light emitting devices are inserted.

\* \* \* \* \*